(12) United States Patent
Steele et al.

(10) Patent No.: US 10,081,732 B2
(45) Date of Patent: Sep. 25, 2018

(54) HYDROPHILIC COATING SYSTEM

(71) Applicant: HAMILTON SUNDSTRAND CORPORATION, Charlotte, NC (US)

(72) Inventors: John W. Steele, New Hartford, CT (US); Carol L. Metselaar, Vernon, CT (US); Barbara M. Peyton, Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/443,905

(22) Filed: Feb. 27, 2017

(65) Prior Publication Data
US 2018/0244930 A1   Aug. 30, 2018

(51) Int. Cl.
| | | |
|---|---|---|
| *F28F 13/18* | (2006.01) | |
| *F28F 19/02* | (2006.01) | |
| *C09D 5/14* | (2006.01) | |
| *C09D 1/00* | (2006.01) | |

(52) U.S. Cl.
CPC ............... *C09D 5/14* (2013.01); *C09D 1/00* (2013.01); *F28F 13/182* (2013.01); *F28F 13/187* (2013.01); *F28F 2245/02* (2013.01); *F28F 2265/20* (2013.01)

(58) Field of Classification Search
CPC .. C09D 5/14; C09D 1/00; F28F 13/182; F28F 13/187; F28F 2245/02; F28F 2265/20; F28F 13/18; F28F 19/02; F28F 2245/00
USPC ......................................... 165/133, DIG. 514
See application file for complete search history.

(56) References Cited

U.S. PATENT DOCUMENTS

| | | | |
|---|---|---|---|
| 3,658,581 A | | 4/1972 | Paul et al. |
| 5,264,250 A | * | 11/1993 | Steele ...................... C09D 5/14 |
| | | | 106/15.05 |
| 5,305,827 A | * | 4/1994 | Steele ...................... C09D 5/14 |
| | | | 106/15.05 |
| 5,562,949 A | * | 10/1996 | Steele ...................... C09D 1/00 |
| | | | 106/15.05 |
| 6,170,564 B1 | * | 1/2001 | Steele ...................... C09D 1/00 |
| | | | 106/15.05 |
| 8,691,254 B2 | | 4/2014 | Peyton et al. |
| 2018/0051178 A1 | * | 2/2018 | Steele ...................... C09D 5/14 |

* cited by examiner

*Primary Examiner* — Justin Jonaitis
(74) *Attorney, Agent, or Firm* — Snell & Wilmer, L.L.P.

(57) ABSTRACT

A hydrophilic coating system may comprise a second coating disposed on a condensing surface, the second coating comprising a second adhesive agent, a second insolubilizer, a second inorganic compound, and a second antimicrobial agent. The second coating may comprise between 40% and 50% by weight second adhesive agent, between 12% and 16% by weight second insolubilizer, between 30% and 40% by weight second inorganic compound, and between 3% and 4% by weight second antimicrobial agent.

20 Claims, 3 Drawing Sheets

HYDROPHILIC COATING SYSTEM

FIELD

This disclosure relates to systems and methods for a hydrophilic coating.

BACKGROUND

Hydrophilic coatings are used in various applications and systems, such as in manned spaceflight applications (e.g., extravehicular mobility units, the international space station, crew capsules, or the like) to remove humidity from the air within the environment. A hydrophilic coating(s) may be applied to a condensing surface of a heat exchanger within a system to remove humidity from the air and wick the condensate through the coating for water collection. Hydrophilic coatings may also comprise antimicrobial additives to prevent microbial proliferation, which may otherwise adversely impact the function of the system or the hydrophilic coating.

SUMMARY

In various embodiments, a hydrophilic coating system may comprise a second coating disposed on a condensing surface, the second coating comprising a second adhesive agent, a second insolubilizer, a second inorganic compound, and a second antimicrobial agent. The second coating may comprise between 40% and 50% by weight second adhesive agent, between 12% and 16% by weight second insolubilizer, between 30% and 40% by weight second inorganic compound, and between 3% and 4% by weight second antimicrobial agent. In various embodiments, the hydrophilic coating system may further comprise a first coating disposed between the second coating and the condensing surface, wherein the first coating comprises between 22% and 63% by weight a first adhesive agent, between 7% and 21% by weight a first insolubilizer, between 22% and 42% by weight a first inorganic compound, and between 0.5% and 3% by weight a first antimicrobial agent.

In various embodiments, the second adhesive agent may comprise at least one of potassium silicate or lead borosilicate. In various embodiments, the second insolubilizer may comprise at least one of zinc oxide or a salt comprising a silicofluoride anion and a cation of at least one of sodium, potassium, barium, or manganese. In various embodiments, the second inorganic compound may comprise at least one of silica or calcium silicate. In various embodiments, the second antimicrobial agent may comprise at least one of an arsenic salt, an iodine salt, an iron salt, a mercury salt, a silver salt, or a tin salt. In various embodiments, the second antimicrobial agent may comprise silver oxide.

In various embodiments, a heat exchanger may comprise a condensing surface, and a second coating disposed on the condensing surface, the second coating comprising a second adhesive agent, a second insolubilizer, a second inorganic compound, and a second antimicrobial agent. The second coating may comprise between 40% and 50% by weight second adhesive agent, between 12% and 16% by weight second insolubilizer, between 30% and 40% by weight second inorganic compound, and between 3% and 4% by weight second antimicrobial agent. In various embodiments, the heat exchanger may further comprise a first coating disposed between the second coating and the condensing surface, wherein the first coating comprises, in between 22% and 63% by weight a first adhesive agent, between 7% and 21% by weight a first insolubilizer, between 22% and 42% by weight a first inorganic compound, and between 0.5% and 3% by weight a first antimicrobial agent.

In various embodiments, the second adhesive agent may comprise at least one of potassium silicate or lead borosilicate. In various embodiments, the second insolubilizer may comprise at least one of zinc oxide or a salt comprising a silicofluoride anion and a cation of at least one of sodium, potassium, barium, or manganese. In various embodiments, the second inorganic compound may comprise at least one of silica or calcium silicate. In various embodiments, the second antimicrobial agent may comprise at least one of an arsenic salt, an iodine salt, an iron salt, a mercury salt, a silver salt, or a tin salt. In various embodiments, the second antimicrobial agent may comprise silver oxide.

In various embodiments, a method for coating a surface may comprise creating a second slurry comprising a second adhesive agent, a second insolubilizer, a second inorganic compound, a second antimicrobial agent, and a second water-based solvent, wherein the second coating may comprise between 17% and 22% by weight second adhesive agent, between 5% and 7% by weight second insolubilizer, between 14% and 17% by weight second inorganic compound, between 1.2% and 1.5% by weight second antimicrobial agent, and between 54% and 63% by weight second water-based solvent; and applying the second slurry to a first coating disposed on the surface, wherein the first coating comprises a first adhesive agent, a first insolubilizer, a first inorganic compound, a first antimicrobial agent, and a first water-based solvent. In various embodiments, the method may further comprise applying a first slurry to the surface, the first slurry comprising the first adhesive agent, the first insolubilizer, the first inorganic compound, the first antimicrobial agent, and the first water-based solvent, wherein the first slurry may comprise between 10% and 30% by weight first adhesive agent, between 3% and 10% by weight first insolubilizer, between 10% and 20% by weight first inorganic compound, between 0.3% and 1.5% by weight first antimicrobial agent, and between 30% and 70% by weight first water-based solvent; and curing the first slurry to form the first coating on the surface.

In various embodiments, applying the second slurry may comprise at least one of spraying or painting the second slurry on the first coating, or submerging the surface in the second slurry. In various embodiments, the method may further comprise curing the second slurry on the first coating to form a second coating. In various embodiments, applying the second slurry may include the second adhesive agent comprising at least one of potassium silicate or lead borosilicate, the second insolubilizer comprising zinc oxide, and the second inorganic compound comprising at least one of silica or calcium silicate. In various embodiments, applying the second slurry may include the antimicrobial agent comprising silver oxide.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures. In the figures, like referenced numerals may refer to like parts throughout the different figures unless otherwise specified.

DETAILED DESCRIPTION

All ranges may include the upper and lower values, and all ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Figure 1:
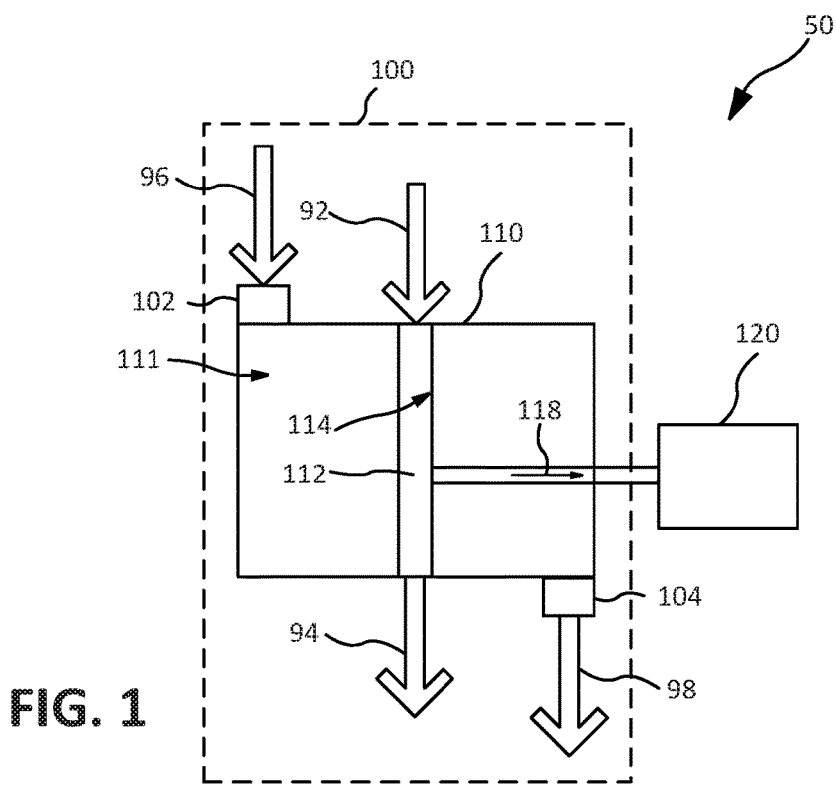
FIG. 1 illustrates a water processing system comprising a condensing heat exchanger, in accordance with various embodiments.

In various systems, such as closed environments, humidity in the air may pose risks to the inhabitants and/or the equipment within the closed environment. For example, in a microgravity environment, humidity may condense out of the air on condensing surfaces, and the condensate has the potential to block passages within various pieces of equipment. With reference to FIG. 1, for instance, a condensing heat exchanger 100 in a water processing system 50 may comprise a thin stock passage 112, through which a primary fluid to be cooled may flow. In various embodiments, the primary fluid may be a gas. Heat exchanger 100 may further comprise a housing 110, which may comprise a housing interior 111 through which a secondary fluid flows to remove heat from the primary fluid. In operation, input primary fluid 92 may enter heat exchanger 100 and travel through thin stock passage 112. Input secondary fluid 96, which may have a lower temperature than input primary fluid 92, may enter housing interior 111 through inlet 102, travel through housing interior 111, and exit through outlet 104. Humidity in input primary fluid 92 may be condensed out by cooling provided by the secondary fluid in housing interior 111 in thermal communication with thin stock passage 112.

The water condensed out of the primary fluid has the potential to block thin stock passage 112. Therefore, in various embodiments, condensing surfaces, such as an interior surface of thin stock passage 112 may be coated with a hydrophilic coating system 114. Hydrophilic coating system 114 may be configured to absorb or wick water condensed on a surface through hydrophilic coating system 114 to remove the water from the passage (e.g., thin stock passage 112). Condensed water 118 from the thin stock passage 112 may be passed to a water processor 120 to be processed for other uses (e.g., processed to drinking quality). Output primary fluid 94 may exit heat exchanger 100 having low or no humidity, and output secondary fluid 98 may exit housing interior 111 having a higher temperature than input secondary fluid 96.

Figure 2A:
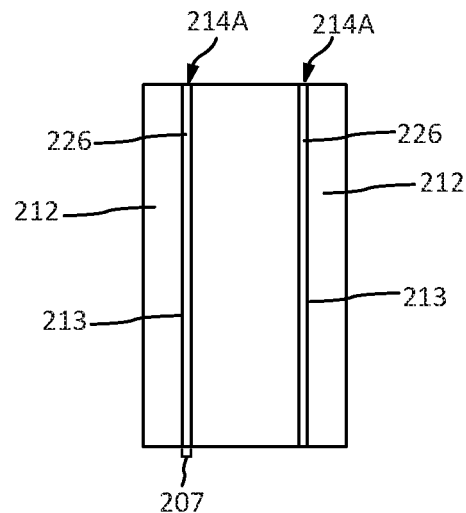
FIGS. 2A and 2B illustrate a passage comprising hydrophilic coating systems, in accordance with various embodiments.
Figure 2B:
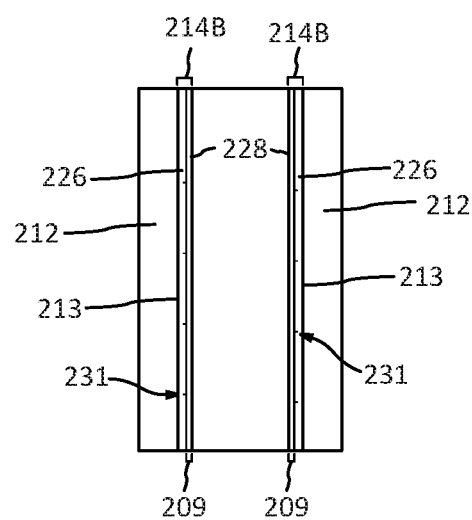

FIGS. 2A and 2B depict axial cross sections of passages (such as thin stock passage 112 in FIG. 1) comprising a hydrophilic coating system 214A or 214B (examples of hydrophilic coating system 114 in FIG. 1). In various embodiments, with combined reference to FIGS. 2A and 2B, hydrophilic coating system 214A or 214B on a condensing surface 213 of a substrate 212 may comprise a first coating 226, which may be applied to condensing surface 213 as a first slurry. The first slurry may comprise a first adhesive agent, a first insolubilizer, a first inorganic compound, a first antimicrobial agent, and/or a first water-based solvent. The first adhesive agent may provide structural integrity to the first coating by binding the coating together and minimizing or preventing flaking and cracking. In various embodiments, the first adhesive agent may comprise potassium silicate and/or lead borosilicate. The first slurry may comprise between 10% and 30% by weight first adhesive agent, or between 18% and 27% by weight first adhesive agent.

The first insolubilizer may be configured to convert the adhesive agent from a water-soluble material, to a water-insoluble material to interact with the other materials in the first slurry. In various embodiments, the first insolubilizer may comprise zinc oxide or a salt comprising a silicofluoride anion and a cation of at least one of sodium, potassium, barium, or manganese. The first slurry may comprise between 3% and 10% by weight first insolubilizer, or between 4% and 8% by weight first insolubilizer. The first insolubilizer may have a particle size between 6 microns (0.00024 inch) and 14 microns (0.00055 inch), or between 8 microns (0.00031 inch) and 10 microns (0.00039 inch).

The first inorganic compound may be configured to serve as a wetting agent by providing a high surface energy or polarity to first coating 226 (formed after curing of the first slurry on condensing surface 213), attracting anions such as hydroxyl ions. The polar surface created by the first inorganic compound in the first slurry may cause a low interfacial energy between a condensate being condensed out of the air and the condensing surface, and therefore, affects the desired wetting. In various embodiments, the first inorganic compound may comprise silica (e.g., silica flour) and/or calcium silicate. The first slurry may comprise between 10% and 20% by weight first inorganic compound, between 13% and 17% by weight first inorganic compound, or between 15% and 16% by weight first inorganic compound. The first inorganic compound may have a particle size between 6 microns (0.00024 inch) and 14 microns (0.00055 inch), or between 8 microns (0.00031 inch) and 10 microns (0.00039 inch).

The first antimicrobial agent may be configured to prevent or minimize the microbial proliferation, for example, by dissolving into the condensate and inhibiting microbial growth. In various embodiments, the first antimicrobial agent may comprise an arsenic salt, an iodine salt, an iron salt, a mercury salt, a silver salt (e.g., silver oxide), and/or a tin salt. The first slurry may comprise between 0.3% and 1.5% by weight first antimicrobial agent, or between 0.8% and 1.2% by weight first antimicrobial agent. The first antimicrobial agent may have a particle size between 6 microns (0.00024 inch) and 14 microns (0.00055 inch), or between 8 microns (0.00031 inch) and 10 microns (0.00039 inch).

In various embodiments, the first water-based solvent may be water, or any other suitable solvent. The first slurry may comprise between 30% and 70% by weight first water-based solvent, or between 40% and 60% by weight first water-based solvent.

Application of the first slurry to condensing surface 213 may comprise spraying and/or painting the first slurry onto condensing surface 213, and/or submerging condensing surface 213 in the first slurry then removing condensing surface 213 from the first slurry at least once. In response to the first slurry being applied to condensing surface 213, it may be dried and/or cured to form first coating 226. Complete removal of the water or water-based solvent and complete curing of the coating may be desired in various embodiments. Various manners of accomplishing water or water-based solvent removal and curing include the use of a vacuum, flowing dry air over the coating, and heating the coating to a temperature which will induce curing without sintering, or other suitable water or water-based solvent removal and curing techniques.

In various embodiments, to dry and/or cure the first slurry to form first coating 226, the temperature of first coating 226 may be slowly raised to about 260° C. (500° F.) sequentially or very slowly over a period of about 1 to about 6 hours. Sequential curing may comprise between 2 and 8 sequential temperature steps or more. For example, a first sequence may remain below about 100° C. (212° F.) for about 1.0 to about 3.0 hours and a final step at about 260° C. (500° F.) for between about 1.0 to about 4.0 hours with possible steps in between.

In various embodiments, with continued reference to FIGS. 2A and 2B, first coating 226 may have a first coating thickness 207 of between 100 microns (0.0039 inch) to 500 microns (0.02 inch). First coating 226 may be porous, such that the condensate or other material may wick through first coating 226 to be transferred to water processor 120 (shown in FIG. 1).

In various embodiments, after curing of the first slurry on condensing surface 213, first coating 226 may comprise little or no water-based solvent (e.g., between 0% and 2% by weight). In various embodiments, first coating 226 may comprise between 22% and 63% by weight first adhesive agent, or between 35% and 50% by weight first adhesive agent. In various embodiments, first coating 226 may comprise between 7% and 21% by weight first insolubilizer, or between 12% and 17% by weight first insolubilizer. In various embodiments, first coating 226 may comprise between 22% and 42% by weight first inorganic compound, or between 30% and 35% by weight first inorganic compound. In various embodiments, first coating 226 may comprise between 0.5% and 3% by weight first antimicrobial agent, or between 1.2% and 2% by weight first antimicrobial agent.

In various embodiments, with continued reference to FIGS. 2A and 2B, first coating 226 on condensing surface 213 (formed from the first slurry) may be the only coating in a hydrophilic coating system (e.g., hydrophilic coating system 214A) on condensing surface 213. In various embodiments, a hydrophilic coating system (e.g., hydrophilic coating system 214B) may comprise a second coating 228 disposed on first coating 226. Second coating 228 may be applied as a second slurry to first coating 226. The second slurry may comprise a second adhesive agent, a second insolubilizer, a second inorganic compound, a second antimicrobial agent, and/or a second water-based solvent. The components of second slurry/second coating may have the same functions in the second coating as the corresponding components of the first slurry/first coating discussed herein (for example, both the first adhesive agent and the second adhesive agent may provide structural integrity to first coating 226 and second coating 228, respectively, by binding the coating together and minimizing or preventing flaking and cracking).

In various embodiments, the second insolubilizer may comprise zinc oxide or a salt comprising a silicofluoride anion and a cation of at least one of sodium, potassium, barium, or manganese. The second insolubilizer may have a particle size between 6 microns (0.00024 inch) and 14 microns (0.00055 inch), or between 8 microns (0.00031 inch) and 10 microns (0.00039 inch). In various embodiments, the second inorganic compound may comprise silica (e.g., silica flour) and/or calcium silicate. The second inorganic compound may have a particle size between 6 microns (0.00024 inch) and 14 microns (0.00055 inch), or between 8 microns (0.00031 inch) and 10 microns (0.00039 inch). In various embodiments, the second antimicrobial agent may comprise an arsenic salt, an iodine salt, an iron salt, a mercury salt, a silver salt (e.g., silver oxide), and/or a tin salt. The second antimicrobial agent may have a particle size between 6 microns (0.00024 inch) and 14 microns (0.00055 inch), or between 8 microns (0.00031 inch) and 10 microns (0.00039 inch). In various embodiments, the second adhesive agent may comprise potassium silicate and/or lead borosilicate. In various embodiments, the second water-based solvent may be water, or any other suitable aqueous solvent.

In various embodiments, the second slurry may comprise between 17% and 22% by weight second adhesive agent, between 18% and 21% by weight second adhesive agent, or between 19% and 20% by weight second adhesive agent. In various embodiments, the second slurry may comprise about 19.4% by weight second adhesive agent, wherein "about" in this context only means plus or minus 0.2% by weight. In various embodiments, the second slurry may comprise between 5% and 7% by weight second insolubilizer, between 5.5% and 6.5% by weight second insolubilizer, or about 6% by weight second insolubilizer, wherein the term "about" in this context only means plus or minus 0.1% by weight. In various embodiments, the second slurry may comprise between 14% and 17% by weight second inorganic compound, between 15% and 16% by weight second inorganic compound, or about 15.5% by weight second inorganic compound, wherein the term "about" in this context only means plus or minus 0.1% weight. In various embodiments, the second slurry may comprise between 1.2% and 1.5% by weight second antimicrobial agent, between 1.3% and 1.5% by weight second antimicrobial agent, or about 1.4% by weight second antimicrobial agent, wherein the term "about" in this context only means plus or minus 0.05% by weight. In various embodiments, the second slurry may comprise between 54% and 63% by weight second water-based solvent, between 57% and 60% by weight second water-based solvent, or about 58% by weight second water-based solvent, wherein the term "about" in this context only means plus or minus 0.5% by weight.

In various embodiments, the second slurry may be applied to the first coating by any suitable method including those discussed in relation to applying the first slurry to condensing surface 213. Additionally, the second slurry may be dried and cured in any suitable manner, including those discussed herein in relation to drying and/or curing the first slurry to form first coating 226.

In various embodiments, after the second slurry has been cured onto first coating 226 to form second coating 228, second coating 228 may comprise between 40% and 50% by weight first adhesive agent, between 42% and 48% by weight first adhesive agent, or about 46% by weight first adhesive agent. The term "about," as used in this context only, means plus or minus 2% by weight. In various embodiments, second coating 228 may comprise between 12% and 16% by weight second insolubilizer, between 13% and 15% by weight second insolubilizer, or about 14% by weight second insolubilizer. The term "about," as used in this context only, means plus or minus 0.5% by weight. In various embodiments, second coating 228 may comprise between 30% and 40% by weight second inorganic compound, between 33% and 38% by weight second inorganic compound, or about 36% by weight second inorganic compound. The term "about," as used in this context only, means plus or minus 1% by weight. In various embodiments, second coating 228 may comprise between 3% and 4% by weight second antimicrobial agent, between 3.1% and 3.5% by weight second antimicrobial agent, or about 3.3% by weight second antimicrobial agent. The term "about," as used in this context only, means plus or minus 0.1% by weight. In various embodiments, second coating 228 may comprise no water-based solvent, or between 0% and 2% by weight water-based solvent.

With reference to FIG. 1, in operation of heat exchanger 100 (or any other system having a condensing surface), as fluid passes through thin stock passage 112, there may be a build-up over time of organic contaminants on hydrophilic coating system 114, such that the organic build-up causes the interior surface of thin stock passage 112 to repel water molecules, lowering the efficacy of hydrophilic coating system 114. To remove the organic contaminants from the condensing surface (e.g., condensing surface 213 in FIGS. 2A and 2B), the surface may be heated such that the contaminants are burned off. Heating the condensing surface may gradually cause loss of the first coating from hydrophilic coating system 114 and/or loss of the antimicrobial character of the first coating. For example, in the case of the first antimicrobial agent comprising silver oxide, heating the condensing surface may convert the silver cation to silver metal, decreasing the antimicrobial character of the first coating. Therefore, with additional reference to FIGS. 2A and 2B, the second slurry may be applied to first coating 226 to add to hydrophilic coating system 214A (to replace coating-loss occurring over time) and/or to add antimicrobial character to hydrophilic coating system 214A that may have been lost while heating the condensing surface to burn off organic build-up. In response to applying the second slurry and subsequent drying of the second slurry, hydrophilic coating system 214B may be formed.

Narrow passages, such as thin stock passage 112 may not have much room for additional components added into the area through which fluids pass. If there is too much material within thin stock passage 112, fluid will not be able to adequately flow. Therefore, the addition of a second slurry to form second coating 228 on first coating 226 may cause the path through thin stock passage 112 to become narrower. However, the second slurry unexpectedly wicks into the porosity of first coating 226 (indicated by protrusions 231 depicted in FIG. 2B), and after curing, second coating 228 thereby adds a very small amount of thickness to hydrophilic coating system 214B (e.g., less than 1.27 microns (0.00005 inch), depicted as a second coating thickness 209 in FIG. 2B). Therefore, the second slurry may be added to first coating 226 without significantly affecting the overall thickness of hydrophilic coating system 114, thereby allowing a hydrophilic coating system (e.g., hydrophilic coating system 214B) to comprise a first and second coating on a condensing surface in a narrow passage (e.g., thin stock passage 112).

In various embodiments, with reference to FIG. 1, hydrophilic coating system 114 may comprise the second coating directly applied to the condensing surface (e.g., the interior surface of thin stock passage 112), such that the first coating is not comprised in hydrophilic coating system 114 (for example, first coating 226 in FIG. 2B would be a coating created by application and curing of the second slurry as described herein). Additionally, the higher weight percentage of the second water-based solvent in the second slurry allows application of the second slurry to condensing surfaces having small areas. The first coating formed by the first slurry on a condensing surface in such a small area may block or inhibit the function of such an area. Therefore, the second slurry may be applied in small passages to create a second coating (without a first coating), without inhibiting the functionality of the passage.

Figure 3:
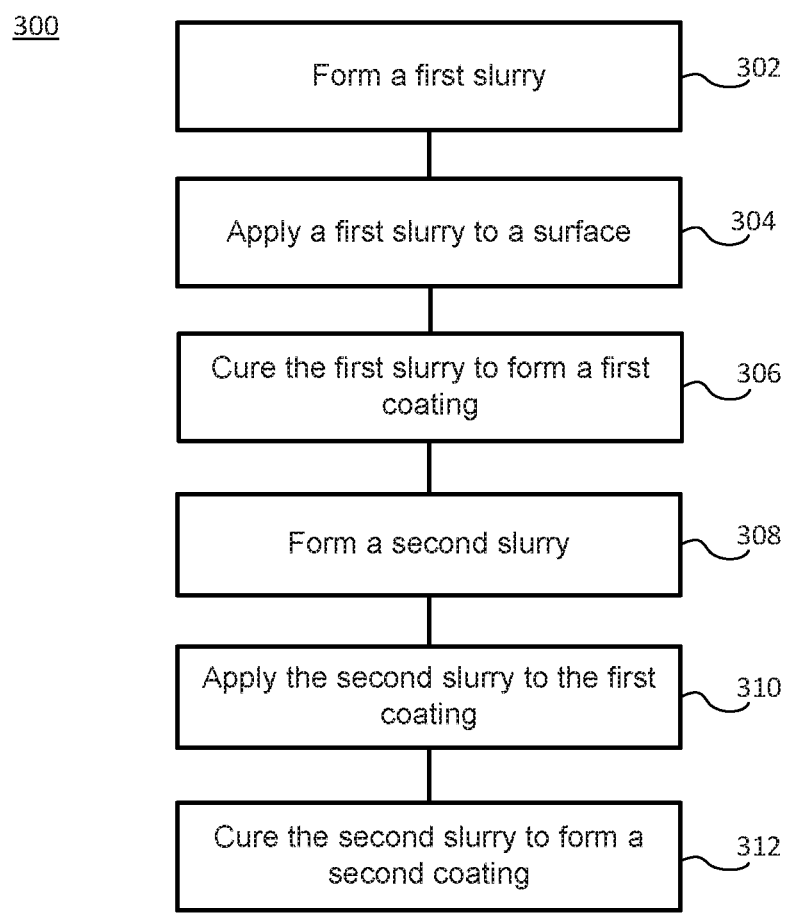
FIG. 3 illustrates a method for applying a hydrophilic coating system to a surface, in accordance with various embodiments.

In accordance with various embodiments, a method 200 for applying a hydrophilic coating system to a surface is depicted in FIG. 3. With combined reference to FIGS. 1, 2A, 2B, and 3, in various embodiments, a first slurry may be formed (step 302) by combining a first adhesive agent, a first insolubilizer, a first inorganic compound, a first antimicrobial agent, and/or a first water-based solvent. The first insolubilizer may comprise zinc oxide or a salt comprising a silicofluoride anion and a cation of at least one of sodium, potassium, barium, or manganese. The first inorganic compound may comprise silica (e.g., silica flour) and/or calcium silicate. The first antimicrobial agent may comprise an arsenic salt, an iodine salt, an iron salt, a mercury salt, a silver salt (e.g., silver oxide), and/or a tin salt. The first adhesive agent may comprise potassium silicate and/or lead borosilicate. The first water-based solvent may be water, or any other suitable solvent. The first slurry may comprise the first adhesive agent, the first insolubilizer, the first inorganic compound, the first antimicrobial agent, and/or the first water-based solvent in the various amounts discussed herein.

The first slurry may be applied to a surface (step 304) (e.g., condensing surface 213 of substrate 212, which may be a passage, such as thin stock passage 112) in any suitable manner such as spraying or painting, or submerging the surface in the first slurry and then removing the surface from the first slurry at least once. The first slurry may be cured to form first coating 226 (step 306) by any of the methods for drying and/or curing the first slurry described herein. First coating 226 may comprise the first adhesive agent, the first insolubilizer, the first inorganic compound, the first antimicrobial agent, and/or the first water-based solvent in the various amounts discussed herein.

In various embodiments, a second slurry may be formed (step 308) by combining a second adhesive agent, a second insolubilizer, a second inorganic compound, a second antimicrobial agent, and/or a second water-based solvent. The second insolubilizer may comprise zinc oxide or a salt comprising a silicofluoride anion and a cation of at least one of sodium, potassium, barium, or manganese. The second inorganic compound may comprise silica (e.g., silica flour) and/or calcium silicate. The second antimicrobial agent may comprise an arsenic salt, an iodine salt, an iron salt, a mercury salt, a silver salt (e.g., silver oxide), and/or a tin salt. The second adhesive agent may comprise potassium silicate and/or lead borosilicate. The second water-based solvent may be water, or any other suitable aqueous solvent. The second slurry may comprise the second adhesive agent, the second insolubilizer, the second inorganic compound, the second antimicrobial agent, and/or the second water-based solvent in the various amounts discussed herein.

The second slurry may be applied to first coating 226 (step 310) in any suitable manner such as spraying or painting, or submerging condensing surface 213 with first coating 226 in the first slurry and then removing condensing surface 213 from the first slurry at least once. The second coating may be wicked into the porosity of first coating 226, depicted as protrusions 231, so little thickness is added to overall hydrophilic coating system 214B (e.g., less than 1.27 microns (0.00005 inch)). The second slurry may be cured to form second coating 228 (step 312) by any of the methods for drying and/or curing the first slurry described herein. Second coating 228 may comprise the second adhesive agent, the second insolubilizer, the second inorganic compound, the second antimicrobial agent, and/or the second water-based solvent in the various amounts discussed herein.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A hydrophilic coated system, comprising:
a coating disposed on a condensing surface, the coating comprising an adhesive agent, an insolubilizer, an inorganic compound, and an antimicrobial agent, wherein the coating comprises between 40% and 50% by weight the adhesive agent, between 12% and 16% by weight the insolubilizer, between 30% and 40% by weight the inorganic compound, and between 3% and 4% by weight the antimicrobial agent.

2. The hydrophilic coated system of claim 1, further comprising a first coating disposed between the coating and the condensing surface, wherein the first coating comprises between 22% and 63% by weight a first adhesive agent, between 7% and 21% by weight a first insolubilizer, between 22% and 42% by weight a first inorganic compound, and between 12% and 17% by weight a first antimicrobial agent.

3. The hydrophilic coated system of claim 1, wherein the adhesive agent comprises at least one of potassium silicate or lead borosilicate glass frit.

4. The hydrophilic coated system of claim 3, wherein the insolubilizer comprises at least one of zinc oxide or a salt comprising a silicofluoride anion and a cation of at least one of sodium, potassium, barium, or manganese.

5. The hydrophilic coated system of claim 4, wherein the inorganic compound comprises at least one of silica or calcium silicate.

6. The hydrophilic coated system of claim 5, wherein the antimicrobial agent comprises at least one of an arsenic salt, an iodine salt, an iron salt, a mercury salt, a silver salt, or a tin salt.

7. The hydrophilic coated system of claim 6, wherein the antimicrobial agent comprises silver oxide.

8. A heat exchanger, comprising:
a condensing surface; and
a coating disposed on the condensing surface, the second coating comprising an adhesive agent, an insolubilizer, an inorganic compound, and an antimicrobial agent, wherein the coating comprises between 40% and 50% by weight the adhesive agent, between 12% and 16% by weight the insolubilizer, between 30% and 40% by weight the inorganic compound, and between 3% and 4% by weight the antimicrobial agent.

9. The heat exchanger of claim 8, further comprising a first coating disposed between the coating and the condensing surface, wherein the first coating comprises between 22% and 63% by weight a first adhesive agent, between 7% and 21% by weight a first insolubilizer, between 22% and 42% by weight a first inorganic compound, and between 12% and 17% by weight a first antimicrobial agent.

10. The heat exchanger of claim 8, wherein the adhesive agent comprises at least one of potassium silicate or lead borosilicate glass frit.

11. The heat exchanger of claim 10, wherein the insolubilizer comprises at least one of zinc oxide or a salt comprising a silicofluoride anion and a cation of at least one of sodium, potassium, barium, or manganese.

12. The heat exchanger of claim 11, wherein the inorganic compound comprises at least one of silica or calcium silicate.

13. The heat exchanger of claim 12, wherein the antimicrobial agent comprises at least one of an arsenic salt, an iodine salt, an iron salt, a mercury salt, a silver salt, or a tin salt.

14. The heat exchanger of claim 13, wherein the antimicrobial agent comprises silver oxide.

15. A method of coating a surface, comprising:
  creating a slurry comprising an adhesive agent, an insolubilizer, an inorganic compound, an antimicrobial agent, and a water-based solvent, wherein the slurry comprises between 17% and 22% by weight the adhesive agent, between 5% and 7% by weight the insolubilizer, between 14% and 17% by weight the inorganic compound, between 1.2% and 1.5% by weight the antimicrobial agent, and between 54% and 63% by weight the water-based solvent; and
  applying the slurry to a first coating disposed on the surface, wherein the first coating comprises a first adhesive agent, a first insolubilizer, a first inorganic compound, a first antimicrobial agent, and a first water-based solvent.

16. The method of claim 15, further comprising:
  applying a first slurry to the surface, the first slurry comprising the first adhesive agent, the first insolubilizer, the first inorganic compound, the first antimicrobial agent, and the first water-based solvent, wherein the first slurry comprises between 10% and 30% by weight the first adhesive agent, between 3% and 10% by weight the first insolubilizer, between 10% and 20% by weight the first inorganic compound, between 0.3% and 1.5% by weight the first antimicrobial agent, and between 30% and 70% by weight the first water-based solvent; and
  curing the first slurry to form the first coating on the surface.

17. The method of claim 15 wherein the applying the slurry comprises at least one of spraying or painting the slurry on the first coating, or submerging the surface in the slurry.

18. The method of claim 15, further comprising curing the slurry on the first coating to form a second coating.

19. The method of claim 15, wherein the applying the slurry includes the adhesive agent comprising at least one of potassium silicate or lead borosilicate glass frit, the insolubilizer comprising zinc oxide, and the inorganic compound comprising at least one of silica or calcium silicate.

20. The method of claim 19, wherein the applying the slurry includes the antimicrobial agent comprising silver oxide.

* * * * *